(12) United States Patent
Benkreira et al.

(10) Patent No.: US 11,244,336 B2
(45) Date of Patent: Feb. 8, 2022

(54) INCENTIVE MANAGEMENT PLATFORM

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US); Matthew Carson, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 95 days.

(21) Appl. No.: 16/780,423

(22) Filed: Feb. 3, 2020

(65) Prior Publication Data

US 2021/0241304 A1 Aug. 5, 2021

(51) Int. Cl.
*G06Q 40/02* (2012.01)
*G06Q 30/02* (2012.01)

(52) U.S. Cl.
CPC ..... *G06Q 30/0215* (2013.01); *G06Q 30/0233* (2013.01)

(58) Field of Classification Search
CPC .......... G06Q 30/0215; G06Q 30/0233
See application file for complete search history.

(56) References Cited

U.S. PATENT DOCUMENTS

| 2008/0082418 A1* | 4/2008 | Fordyce | G06Q 30/02 705/14.34 |
|---|---|---|---|
| 2020/0184556 A1* | 6/2020 | Cella | G06Q 10/0639 |

OTHER PUBLICATIONS

Predicting Next Shopping Stage Using Google Analytics Data for E-Commerce Applications, Mihai Cristian Pîrvu, p. 3 (Year: 2019).*

* cited by examiner

*Primary Examiner* — Abhishek Vyas
*Assistant Examiner* — Darnell A Pouncil
(74) *Attorney, Agent, or Firm* — Harrity & Harrity, LLP

(57) ABSTRACT

A device may receive, from a user device, credentials for a transaction account associated with a user. The device may provide, to a merchant device, authorization information enabling access to an indication of an incentive status associated with the user and the transaction account, wherein the incentive status indicates whether an incentive is available for the user. The device may receive, from the merchant device, an incentive status request including the authorization information. The device may determine that the authorization information is valid and is associated with the transaction account. The device may determine a current incentive status for the incentive, wherein the current incentive status is based on a satisfaction of a condition associated with the transaction account. The device may provide, to the merchant device, the indication of the current incentive status for the incentive.

20 Claims, 9 Drawing Sheets

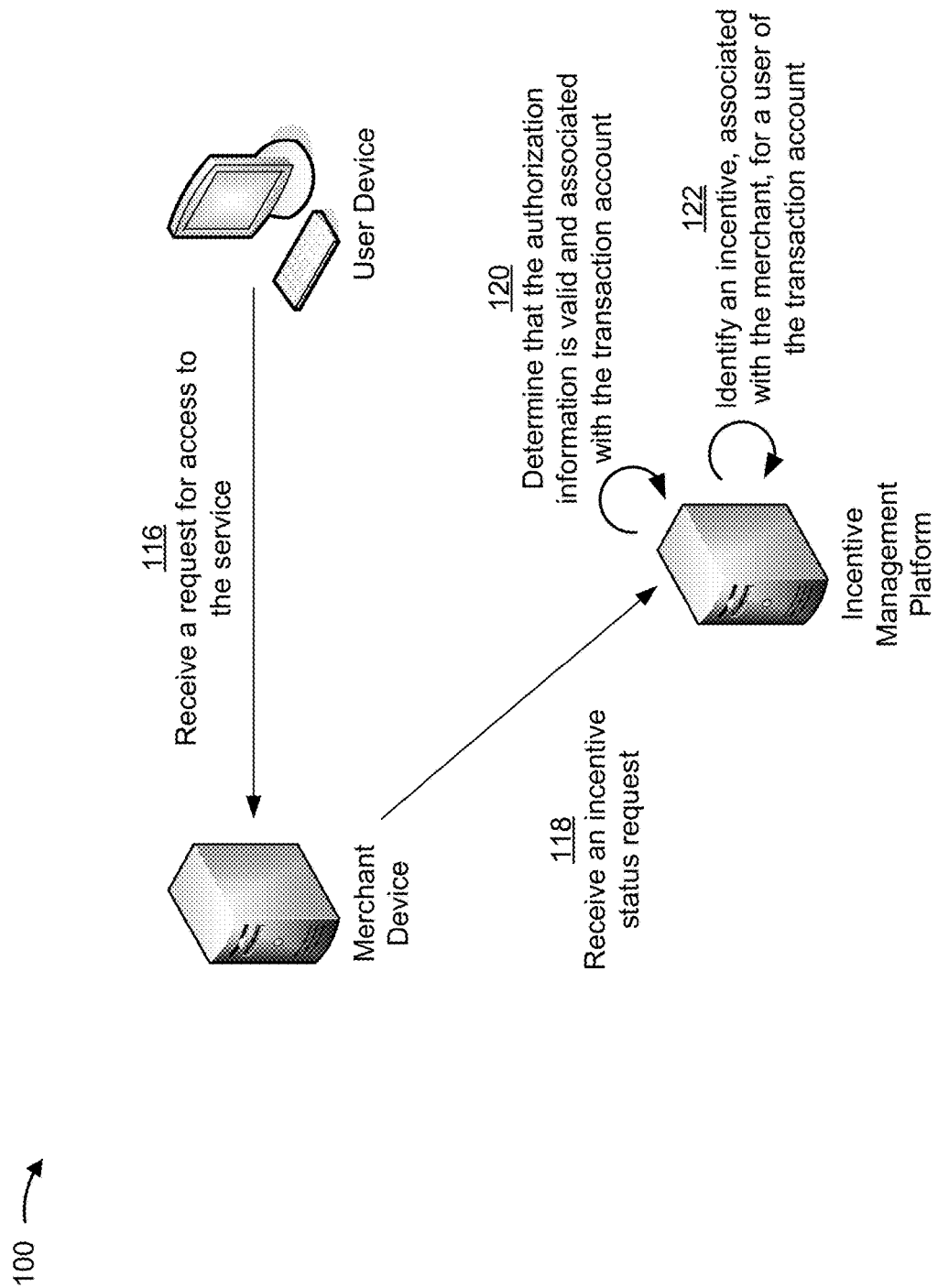

INCENTIVE MANAGEMENT PLATFORM

BACKGROUND

Transaction account providers, such as financial institutions, may provide incentives to users associated with transaction accounts as perks for maintaining the transaction accounts, such as for staying current on payments associated with the transaction accounts, for making timely payments associated with the transaction accounts, for spending a threshold amount on the transaction accounts, for maintaining a certain membership status for the transaction accounts, for maintaining a threshold amount of money in the transaction accounts, and/or the like. The incentives may include discounted services or memberships for services provided by third-party merchants, such as media streaming services.

SUMMARY

According to some implementations, a method may include receiving, by a device and from a user device, credentials for a transaction account, wherein the transaction account is associated with a user; determining, by the device, a validity of the credentials for the transaction account; providing, by the device, to a merchant device, and based on determining the validity of the credentials, authorization information enabling access to an indication of an incentive status associated with the user, wherein the incentive status is associated with the transaction account, and wherein the incentive status indicates whether an incentive is available for the user; receiving, by the device and from the merchant device, an incentive status request, wherein the incentive status request includes the authorization information; determining, by the device, that the authorization information is valid and is associated with the transaction account; determining, by the device and based on determining that the authorization information is valid and is associated with the transaction account, a current incentive status for the incentive, wherein the current incentive status for the incentive is based on a satisfaction of a condition associated with the transaction account; and providing, by the device and to the merchant device, the indication of the current incentive status for the incentive, wherein the indication of the current incentive status enables the merchant device to determine whether to apply the incentive to a user account associated with the user.

According to some implementations, a device may include one or more memories; and one or more processors, communicatively coupled to the one or more memories, configured to: determine an incentive associated with a merchant that is associated with a merchant device, wherein availability of the incentive, for a user, is based on satisfaction of a condition associated with a transaction account that is associated with the user, and wherein the incentive is determined to increase a probability of the user maintaining a status of the transaction account; receive, from a user device, credentials for the transaction account; determine a validity of the credentials for the transaction account; provide, to the merchant device and based on determining the validity of the credentials, authorization information enabling access to an indication of an incentive status associated with the user, wherein the incentive status is associated with the transaction account, and wherein the incentive status indicates whether the incentive is available for the user; receive, from the merchant device, an incentive status request, wherein the incentive status request includes the authorization information; determine that the authorization information is valid and is associated with the transaction account; determine, based on determining that the authorization information is valid and is associated with the transaction account, a current incentive status for the incentive, wherein the current incentive status for the incentive is based on the satisfaction of the condition associated with the transaction account; and provide, to the merchant device, the indication of the current incentive status for the incentive, wherein the indication of the current incentive status enables the merchant device to determine whether to apply the incentive to a user account associated with the user.

According to some implementations, a non-transitory computer-readable medium may store one or more instructions. The one or more instructions, when executed by one or more processors of a device, may cause the one or more processors to: determine an incentive associated with a merchant that is associated with a merchant device, wherein availability of the incentive, for a user, is based on satisfaction of a condition associated with a transaction account that is associated with the user, and wherein the incentive is determined, using a machine learning process, to increase a probability of the user maintaining a status of the transaction account; receive, from a user device, a request for an open authorization (OAuth) token, wherein the request for the OAuth token comprises credentials for the transaction account and an identification of the merchant device; provide, to the merchant device and based on determining a validity of the credentials, authorization information enabling access to an indication of an incentive status associated with the user, wherein the incentive status is associated with the transaction account, and wherein the incentive status indicates whether the incentive is available for the user; receive, from the merchant device, an incentive status request, wherein the incentive status request includes the OAuth token; determine that the OAuth token is valid and is associated with the transaction account; determine, based on determining that the OAuth token is valid and is associated with the transaction account, a current incentive status for the incentive, wherein the current incentive status for the incentive is based on satisfaction of the condition associated with the transaction account; and provide, to the merchant device, the indication of the current incentive status for the incentive, wherein the indication of the current incentive status enables the merchant device to determine whether to apply the incentive to a user account associated with the user.

BRIEF DESCRIPTION OF THE DRAWINGS

FIGS. 1A-1D are diagrams of one or more example implementations described herein.

DETAILED DESCRIPTION

Figure 1A:
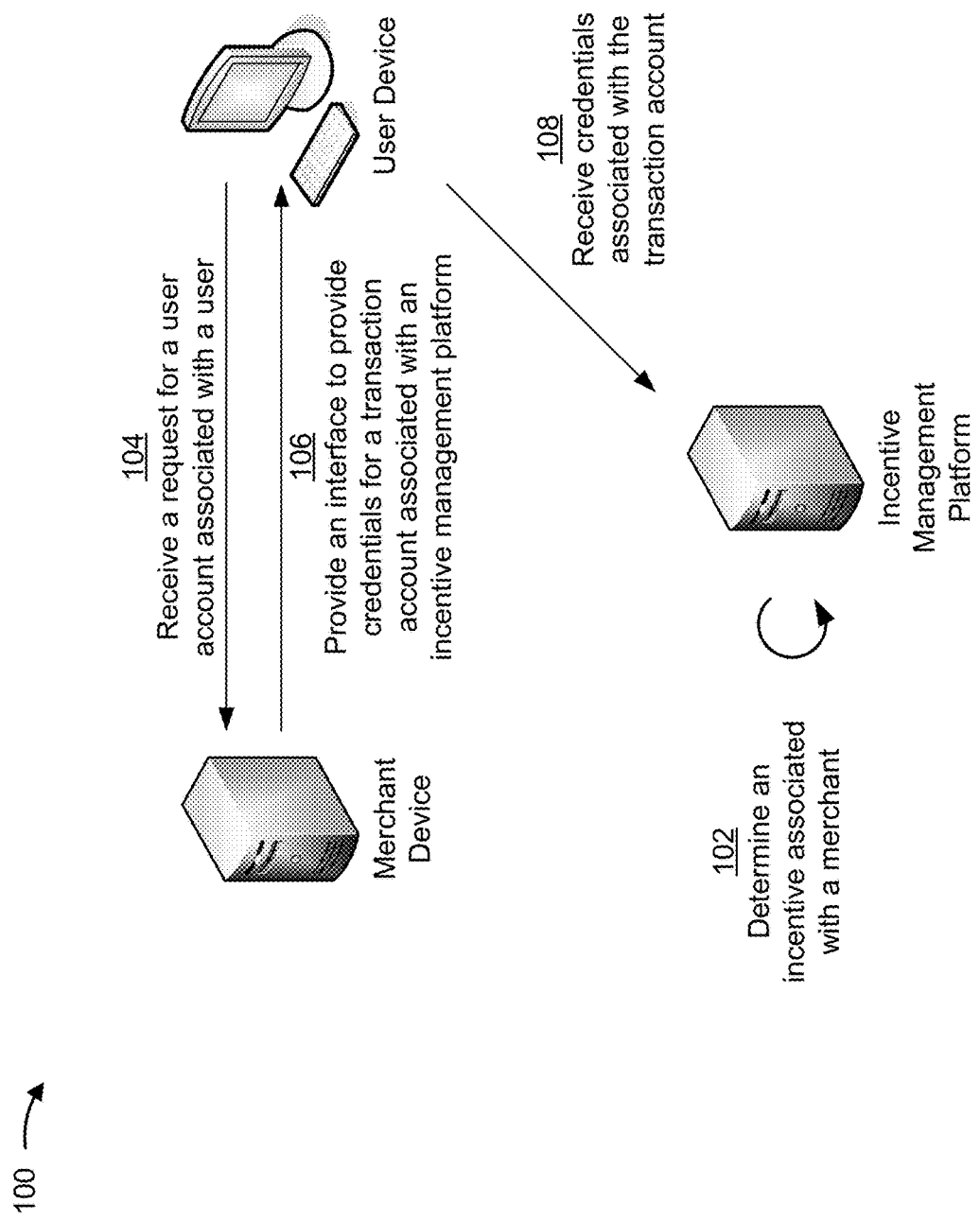

The following detailed description of example implementations refers to the accompanying drawings. The same reference numbers in different drawings may identify the same or similar elements.

Transaction account providers (e.g., banks, credit card issuers, and/or the like) may provide incentives to users for using and/or maintaining an associated transaction account. Some of these incentives are associated with services offered by merchants, such as media streaming providers, digital marketplace providers, digital subscription service providers, and/or the like.

To receive an incentive associated with a service offered by a merchant, a user may provide, to the merchant, an indication that the user is associated with a transaction account that entitles the user to the incentive. The merchant may perform a one-time verification that the user is entitled to the incentive. Verifying that the user is entitled to the incentive may include the merchant requesting, from the user, information and authorization to check an account status with an associated transaction account provider, the merchant providing the information and an indication of the authorization to the associated transaction account provider, the transaction account provider verifying the authorization to attempt to avoid fraudulent access to confidential information of the user, the transaction account provider identifying the transaction account and checking the associated account status, and the transaction account provider providing the account status to the merchant.

Because this verification process consumes computing resources, (e.g., processor resources, memory resources, communication resources, and/or the like), the merchant may verify that the user is entitled to the incentive only at the time the user initially requests access to the incentive. Additionally, the user may risk fraud and/or identity theft by providing, to the merchant, the authorization to access the transaction account, which authorization may be misused and/or stolen by a malefactor. Computing resources may be used to identify, investigate, and recover from such fraudulent activity and/or identity theft.

Because the amount of computing resources used to verify that the user is entitled to the incentive discourages a merchant from repeating the verification process, a user may apply for a transaction account to access the incentive and then cancel the transaction account after the merchant performs the verification process. This may consume computing resources of the transaction account provider that are used to generate the transaction account, associate one or more payment methods to the transaction account, perform security checks on the transaction account, associate the transaction account with one or more incentives, cancel the transaction account, and maintain secure records associated with the transaction account. Additional computing resources are consumed to market to users having canceled transaction accounts, and generate new accounts if the marketing successfully results in the users activating new transaction accounts.

Alternatively, to receive an incentive associated with a service offered by a merchant, the user may pay for the service using the transaction account. The transaction account provider may query the transaction account to attempt to find all transactions related to incentives available to the user and determine if an incentive should be applied to credit the transaction account retroactively. However, this process may use computing resources to manually perform the query, determine whether a credit should be applied to the transaction account, determine an amount of the credit, apply the amount of the credit, and/or the like.

Some implementations described herein provide a device (e.g., associated with the transaction account provider) that provides an indication of a current incentive status, associated with an incentive for a user, to a merchant device to enable the merchant device to determine whether to apply the incentive to a user account associated with the user.

The device may receive, from a user device, a request to provide authorization information to a merchant device, which authorization information enables the merchant device access, presently or at a future time, to an indication of an incentive status for a transaction account associated with the user device. When the user device requests access to a service associated with the incentive, the merchant device may provide an incentive status request, including the authorization information, to the device. The device may determine whether the incentive is available for the user and provide, to the merchant device, an indication of a current incentive status for the incentive.

Accordingly, the device may dynamically manage incentives provided by merchants to users of transaction accounts associated with the transaction account provider. The device may conserve computing resources that may otherwise be used during a conventional verification process described above.

Additionally, by dynamically managing incentives provided by merchants, users are disincentivized from activating a transaction account to receive an incentive and then canceling the transaction account once the merchant performs a verification process. This may conserve computing resources that may otherwise be used to generate the transaction account, associate one or more payment methods to the transaction account, perform security checks on the transaction account, associate the transaction account with one or more incentives, cancel the transaction account, and maintain secure records associated with the transaction account.

Further, because the user device provides credentials, for a transaction account, to the device associated with the transaction account provider, and the merchant device may receive only limited access to information about the transaction account, the transaction account may be more secure than if the user device provides credentials for the transaction account to merchant devices. This may conserve computing resources that may otherwise be used to identify, investigate, and recover from fraudulent activity and/or identity theft caused by misused or stolen credentials to the transaction account.

FIGS. 1A-1D are diagrams of one or more example implementations 100 described herein. As shown in FIGS. 1A-1D, the example implementation(s) 100 may include an incentive management platform, a merchant device, and a user device. In some implementations, a function described as being performed by one of these devices may be performed by a different one of these devices.

In some implementations, a user associated with the user device may activate a transaction account with a transaction account provider (e.g., a credit card issuer, a bank, and/or the like). The user and the transaction account provider may agree on credentials that the user may provide (e.g., via the user device) to gain access to information associated with the transaction account. In some implementations, the transaction account may be associated with a transaction card, a transaction account identifier, and/or the like that can be provided to a merchant to authorize a payment using the transaction account.

As shown in FIG. 1A, and by reference number 102, the incentive management platform may determine an incentive associated with the merchant. In some implementations, the incentive may relate to a streaming service that may be provided to a user, such as a streaming video library, a live video stream, an audio stream, and/or the like. In some implementations, the incentive may relate to another online subscription service, such as a social media platform, an online software tool, and/or the like. Availability of the incentive, for the user, may be based on satisfaction of one or more conditions associated with the transaction account that is associated with the user.

The incentive management platform may determine and/or manage incentives related to one or more different (e.g., independent, unaffiliated, and/or the like) merchants. The incentives may relate to one or more types of transaction accounts (e.g., credit card types, debit card types, bank account types, brokerage types, and/or the like). Accordingly, an incentive may be available for transaction accounts of one or more specified types and may relate to one or more different merchants, as defined for the incentive.

The incentive may include a definition that includes a duration of activity of the incentive (how long the incentive remains in effect for a user before renewal is necessary), a quantity of uses of the incentive available to the user (e.g., a quantity of times the user may apply the incentive before renewal is necessary), a discount amount for a product or service associated with the incentive, access to a product or service associated with the incentive, and/or the like. For example, the incentive may include a definition stating that the incentive is available for one month, the user can use the incentive to gain access to three media streaming events, the incentive provides a discount of 50%, and/or the incentive provides access to an ad-free streaming service provided by the merchant.

In some implementations, the incentive management platform may determine the incentive based on determining that the incentive will result in an increased probability of the user maintaining a status of the transaction account. In some implementations, the incentive management platform may determine the incentive based on the increase of the probability satisfying a threshold increase of the probability. Similarly, the incentive management platform may determine the incentive based on the incentive increasing the probability enough to satisfy a threshold probability of the user maintaining a status of the transaction account.

In some implementations, the incentive management platform, or another device, may use one or more artificial intelligence techniques, such as machine learning, deep learning, and/or the like to determine an incentive, associated with a merchant, for a user of a transaction account.

In some implementations, the incentive management platform may parse natural language descriptions of parameters of incentives. For example, the incentive management platform may obtain data identifying, in natural language, a description of historical incentives, and may parse the data to identify parameters associated with the incentives, and/or the like.

In some implementations, the incentive management platform may determine a characteristic of an incentive based on natural language processing of the parameters of the incentive, which may include a description of a duration of activity of the incentive, a quantity of uses of the incentive available to the user, a discount amount for a product or service associated with the merchant, a type of product or service to which the incentive provides access, and/or the like. For example, based on a description of an incentive being "50% off for a month of an unlimited video streaming subscription through Internet Movie Provider ABC", the incentive management platform may use natural language processing to determine that a characteristic of the incentive is that the incentive is associated with a 50% discount, which discount lasts for one month, on an unlimited video streaming subscription provided by a merchant named "Internet Movie Provider ABC."

In this way, the incentive management platform may identify characteristics associated with whether the incentive results in an increased probability of the user maintaining a status of the transaction account, whether the increase satisfies a threshold increased probability, whether the increase results in a probability that satisfies a threshold probability, and/or the like, as described herein. Based on applying a rigorous and automated process associated with determining whether the incentive results in an increased probability of the user maintaining a status of the transaction account, whether the increase satisfies a threshold increased probability, whether the increase results in a probability that satisfies a threshold probability, and/or the like, the incentive management platform enables recognition and/or identification of thousands or millions of parameters of incentives for thousands or millions of incentives, thereby increasing an accuracy and consistency of determining whether the incentive results in an increased probability of the user maintaining a status of the transaction account, whether the increase satisfies a threshold increased probability, whether the increase results in a probability that satisfies a threshold probability, and/or the like, relative to requiring computing resources to be allocated for hundreds or thousands of technicians to manually determine whether the incentive results in an increased probability of the user maintaining a status of the transaction account, whether the increase satisfies a threshold increased probability, whether the increase results in a probability that satisfies a threshold probability, and/or the like, of the thousands or millions of incentives.

In some implementations, the incentive management platform may determine whether an incentive results in an increased probability of the user maintaining a status of the transaction account, whether the increase satisfies a threshold increased probability, whether the increase results in a probability that satisfies a threshold probability, and/or the like, as described herein. For example, using parameters of an incentive, the incentive management platform may determine whether the incentive results in an increased probability of the user maintaining a status of the transaction account, whether the increase satisfies a threshold increased probability, whether the increase results in a probability that satisfies a threshold probability, and/or the like.

In this case, the incentive management platform may generate an incentives model. For example, the incentive management platform may train a model using information that includes a plurality of identifications of merchants associated with historical incentives, a plurality of durations of activities of the historical incentives, a plurality of quantities of uses of the historical incentives available to users, a plurality of discount amounts for product or services associated with the merchants, types of products or services associated with the merchant, results of the historical incentives, such as whether the historical incentives resulted in an increased probability of the users maintaining a status of the transaction accounts, whether the increases satisfied a threshold increased probability, whether the increase resulted in a probability that satisfied a threshold probability, and/or the like.

As an example, the incentive management platform may determine that certain parameters of historical incentives are associated with a threshold probability of being associated with the historical incentives increasing a probability of users maintaining a status of transaction accounts, producing an increase that satisfies a threshold increased probability, producing an increase that results in a probability that satisfies a threshold probability, and/or the like. In some implementations, the incentive management platform may use a scoring system (e.g., with relatively high scores and/or relatively low scores) to identify and/or classify incentive parameters as being associated with one another. In this case, the incentive management platform may determine that a relatively high score (e.g., as being likely to be identified) is to be assigned to incentive parameters that are determined to be the same or similar as previously identified incentive parameters of incentives that increased a probability of users maintaining a status of the transaction accounts, produced an increase that satisfies a threshold increased probability, produced an increase that results in a probability that satisfies a threshold probability, and/or the like (or more frequently identified than past identified incentive parameters). In contrast, the incentive management platform may determine that a relatively low score (e.g., as being unlikely to be identified) is to be assigned to incentive parameters that are determined to be different than previously identified incentive parameters of incentives that increased a probability of the users maintaining a status of the transaction accounts, produced an increase that satisfies a threshold increased probability, produced an increase that results in a probability that satisfies a threshold probability, and/or the like (or less frequently identified than past identified incentive parameters).

In some implementations, the incentive management platform may perform a data preprocessing operation when generating the incentives model. For example, the incentive management platform may preprocess data (e.g., descriptions of parameters of the incentives, and/or the like) to remove non-ASCII characters, white spaces, confidential data, and/or the like. In this way, the incentive management platform may organize thousands, millions, or billions of data items for machine learning and model generation.

In some implementations, the incentive management platform may perform a training operation when generating the incentives model. For example, the incentive management platform may portion descriptions of parameters of incentives into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the incentive management platform may preprocess and/or perform dimensionality reduction to reduce the descriptions of parameters of incentives to a minimum feature set. In some implementations, the incentive management platform may train the incentives model on this minimum feature set, thereby reducing processing to train the machine learning model, and may apply a classification technique, to the minimum feature set.

In some implementations, the incentive management platform may use a classification technique, such as a logistic regression classification technique, a random forest classification technique, a gradient boosting machine learning (GBM) technique, and/or the like, to determine a categorical outcome (e.g., that the incentive does or does not result in an increased probability of the user maintaining a status of the transaction account, the increase satisfying a threshold increased probability, the increase resulting in a probability that satisfies a threshold probability, and/or the like). Additionally, or alternatively, the incentive management platform may use a naïve Bayesian classifier technique. In this case, the incentive management platform may perform binary recursive partitioning to split the data of the minimum feature set into partitions and/or branches and use the partitions and/or branches to perform predictions (e.g., that the incentive results in an increased probability of the user maintaining a status of the transaction account, the increase satisfies a threshold increased probability, the increase results in a probability that satisfies a threshold probability, and/or the like). Based on using recursive partitioning, the incentive management platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the incentive management platform may use a support vector machine (SVM) classifier technique to generate a non-linear boundary between data items in the training set. In this case, the non-linear boundary is used to classify test data (e.g., data relating to one or more parameters of an incentive) into a particular class (e.g., a class indicating that the incentive does result in an increased probability of the user maintaining a status of the transaction account, the increase satisfying a threshold increased probability, the increase resulting in a probability that satisfies a threshold probability, and/or the like; a class indicating that the incentive does not result in an increased probability of the user maintaining a status of the transaction account, the increase satisfying a threshold increased probability, the increase resulting in a probability that satisfies a threshold probability, and/or the like; and/or the like).

Additionally, or alternatively, where the test data includes image data, video data, and/or the like, the incentive management platform may use a computer vision technique, such as a convolutional neural network technique to assist in classifying test data (e.g., data relating a parameter of an incentive) into a particular class (e.g., a class indicating that the incentive does result in an increased probability of the user maintaining a status of the transaction account, the increase satisfying a threshold increased probability, the increase resulting in a probability that satisfies a threshold probability, and/or the like; a class indicating that the incentive does not result in an increased probability of the user maintaining a status of the transaction account, the increase satisfying a threshold increased probability, the increase resulting in a probability that satisfies a threshold probability, and/or the like; and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an object in motion technique (e.g., an optical flow framework and/or the like), and/or the like.

Additionally, or alternatively, the incentive management platform may train the incentives model using a supervised training procedure that includes receiving input to the model from a subject matter expert, which may reduce an amount of time, an amount of processing resources, and/or the like to train the incentives model relative to an unsupervised training procedure. In some implementations, the incentive management platform may use one or more other model training techniques, such as a neural network technique, a latent semantic indexing technique, and/or the like. For example, the incentive management platform may perform an artificial neural network processing technique (e.g., using a two-layer feedforward neural network architecture, a three-layer feedforward neural network architecture, and/or the like) to perform pattern recognition with regard to patterns of whether parameters of incentives described using different semantic descriptions result in an increased probability of the user maintaining a status of the transaction account, whether the increase satisfies a threshold increased probability, whether the increase results in a probability that satisfies a threshold probability, and/or the like, or not. In this case, using the artificial neural network processing technique may improve an accuracy of a model (e.g., the incentives model) generated by the incentive management platform by being more robust to noisy, imprecise, or incomplete data, and by enabling the incentive management platform to detect patterns and/or trends undetectable to human analysts or systems using less complex techniques.

As an example, the incentive management platform may use a supervised multi-label classification technique to train the model. For example, as a first step, the incentive management platform may map parameters of incentives to results of increasing a probability of the user maintaining a status of the transaction account, the increase satisfying a threshold increased probability, the increase resulting in a probability that satisfies a threshold probability, and/or the like. In this case, the parameters may be characterized as increasing a probability that a user maintains a status of an associated transaction account or not, based on characteristics of the parameters (e.g., whether a characteristic of a parameter is similar or associated with a characteristic of a parameter that results in increasing a probability of the user maintaining a status of the transaction account, the increase satisfying a threshold increased probability, the increase resulting in a probability that satisfies a threshold probability, and/or the like) and an analysis of the parameters (e.g., by a technician, thereby reducing processing relative to the incentive management platform being required to analyze each activity). As a second step, the incentive management platform may determine classifier chains, whereby labels of target variables may be correlated (e.g., in this example, labels may be parameters of incentives and correlation may refer to a common characteristic of parameters). In this case, the incentive management platform may use an output of a first label as an input for a second label (as well as one or more input features, which may be other data relating to the whether the incentive results in an increased probability of the user maintaining a status of the transaction account, whether the increase satisfies a threshold increased probability, whether the increase results in a probability satisfying a threshold probability, and/or the like), and may determine a likelihood that a particular parameter, or set of parameters, that includes a set of characteristics (some of which are associated with a particular an incentive and some of which are not associated with the particular an incentive) are associated with the particular an incentive based on a similarity to other parameters that include similar characteristics. In this way, the incentive management platform transforms classification from a multilabel-classification problem to multiple single-classification problems, thereby reducing processing utilization. As a third step, the incentive management platform may determine a Hamming Loss Metric relating to an accuracy of a label in performing a classification by using the validation set of the data. For example, an accuracy with which a weighting applied to each parameter or characteristic and whether each parameter or characteristic is associated with an incentive that results in an increase of a probability that the user maintains a status of the transaction account, the increase satisfying a threshold increased probability, the increase resulting in a probability that satisfies a threshold probability, and/or the like, or not, results in a correct prediction of whether an incentive results in an increase of a probability that the user maintains a status of the transaction account, the increase satisfying a threshold increased probability, the increase resulting in a probability that satisfies a threshold probability, and/or the like, thereby accounting for differing amounts to which association of any one parameter or characteristic influences a prediction for an incentive. As a fourth step, the incentive management platform may finalize the model based on labels that satisfy a threshold accuracy associated with the Hamming Loss Metric and may use the model for subsequent prediction of whether parameters of an incentive are to result in increasing a probability of the user maintaining a status of the transaction account, the increase satisfying a threshold increased probability, the increase resulting in a probability that satisfies a threshold probability, and/or the like.

As another example, the incentive management platform may determine, using a linear regression technique, that a threshold percentage of parameters if incentives, in a set of incentives, do not result in increasing a probability of the user maintaining a status of the transaction account, the increase satisfying a threshold increased probability, the increase resulting in a probability that satisfies a threshold probability, and/or the like, and may determine that those parameters are to receive relatively low association scores. In contrast, the incentive management platform may determine that another threshold percentage of parameters do result in increasing a probability of the user maintaining a status of the transaction account, the increase satisfying a threshold increased probability, the increase resulting in a probability that satisfies a threshold probability, and/or the like and may assign a relatively high association score to those parameters. Based on the characteristics of the parameters of incentives that result in increasing a probability of the user maintaining a status of the transaction account, the increase satisfying a threshold increased probability, the increase resulting in a probability that satisfies a threshold probability, and/or the like, or not, the incentive management platform may generate the incentives model and may use the incentives model for analyzing new parameters, and/or the like that the incentive management platform identifies.

In some implementations, a different device, such as a server device, may generate and train the model. The different device may send the model for use by the incentive management platform. The different device may update and send (e.g., on a scheduled basis, on an on-demand basis, on a triggered basis, on a periodic basis, and/or the like) the model to the incentive management platform.

Accordingly, the incentive management platform may use any number of artificial intelligence techniques, machine learning techniques, deep learning techniques, and/or the like to determine whether an incentive results in an increased probability of the user maintaining a status of the transaction account, whether the increase satisfies a threshold increased probability, whether the increase results in a probability that satisfies a threshold probability, and/or the like By intelligently determining incentives to provide to users associated with transaction accounts, the incentive management platform may contribute to users maintaining a status of the transaction accounts. This may conserve computing resources that may otherwise be used to cancel the transaction accounts (based on the user not maintaining the status of the transaction account), maintain secure records associated with the transaction accounts, market to users having canceled transaction accounts, generate new accounts if the marketing successfully results in the users activating new transaction accounts, and/or the like.

As shown by reference number 104, the merchant device may receive a request for a user account associated with the user. This may be part of an account set-up process between the user device and the merchant device. The user account may be associated with one or more account preferences (e.g., types of media preferred, playlists, and/or the like), information about the user, a transaction account through which the merchant device may receive payments from the user, and/or the like.

As shown by reference number 106, the merchant device may provide an interface for the user device to provide credentials for the transaction account associated with the incentive management platform. The merchant device may provide the interface via an interactive website, an application programming interface, and/or the like. In some implementations, the merchant device may automatically connect the user device to an interface (e.g., an interactive website) operated by an entity associated with the incentive management platform, provide a link to an interactive webpage operated by the entity, and/or the like.

As shown by reference number 108, the incentive management platform may receive, from the user device, credentials for the transaction account. The user device may also provide an identification of the merchant device that the user device intends to provide with authorization to access information related to the transaction account. The user device may request that the authorization information is provided to the user device for delivery to the merchant device, that the authorization is provided to the merchant device without further input from the user device, and/or the like.

In some implementations, the user device may provide the credentials as part of a request for authorization information in the form of an OAuth token. The user device may indicate a type or amount of access to provide to the merchant device. For example, the authorization information may provide access to only some information related to the transaction account, such as a status of the account. The status of the account may relate to conditions affecting whether or not an incentive, associated with the merchant device, is available for the user associated with the user account. The status may indicate whether the transaction account is active, the user is current with payments for the transaction account, a threshold spending amount using the transaction account has been satisfied, the transaction account has been used to purchase a qualifying product or service, the transaction account performs recurring payments to another entity, and/or the like. In some implementation, the status may indicate whether a condition is satisfied, whether an incentive is available for the user, and/or the like.

In this way, the authorization information, which may be used to gain access to information related to the transaction account without providing credentials to the merchant device, can provide only limited access to the information related to the transaction account. In this way, the transaction account may be more secure than if the user device provides credentials for the transaction account to merchant devices, which may conserve computing resources that may otherwise be used to identify, investigate, and recover from fraudulent activity and/or identity theft caused by misused or stolen credentials to the transaction account.

Figure 1B:
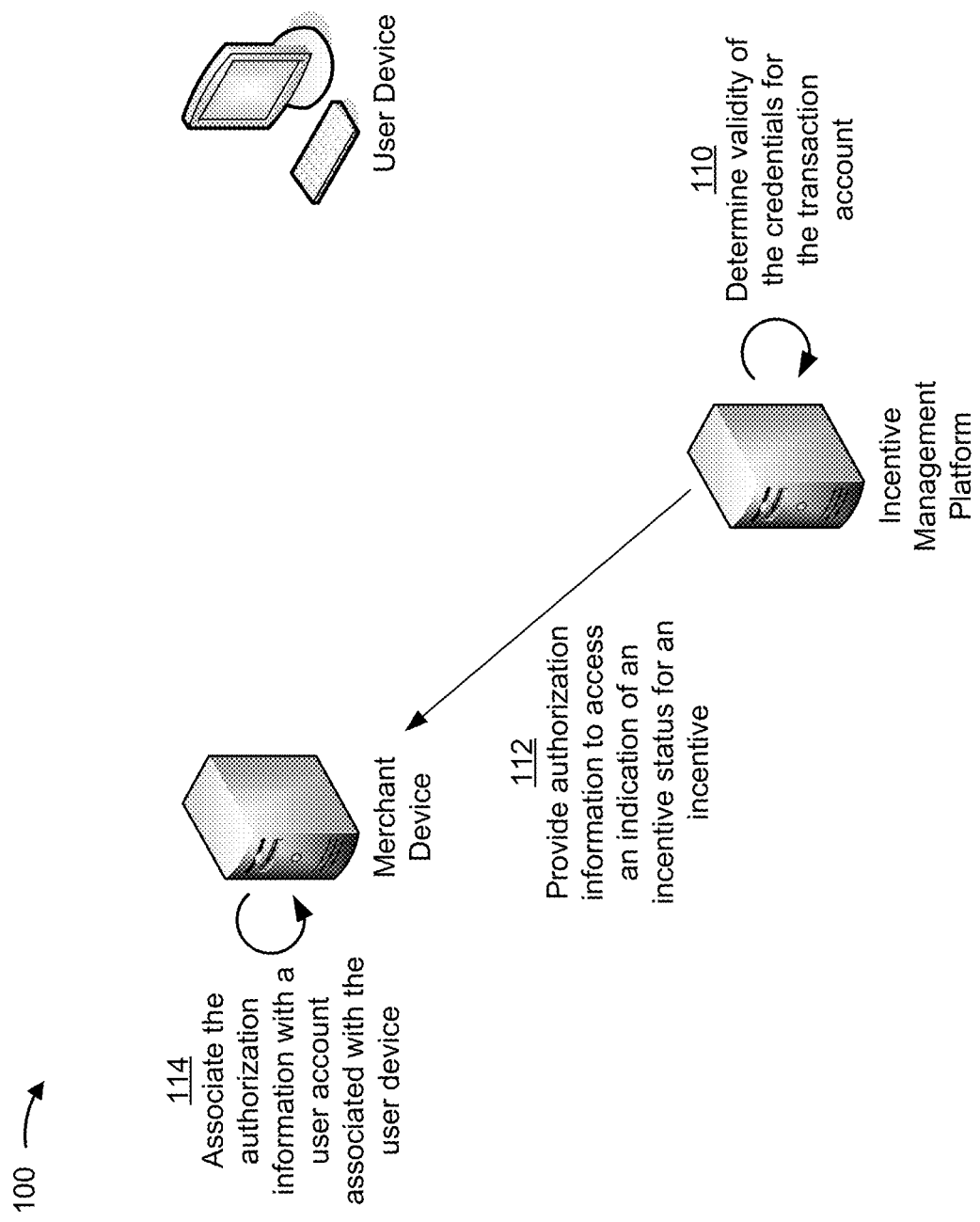

As shown in FIG. 1B, and by reference number 110, the incentive management platform may determine a validity of the credentials, provided by the user device, for the transaction account. For example, the incentive management platform may compare the credentials provided with credentials agreed upon during activation of the transaction account.

As shown by reference number 112, the incentive management platform may provide the authorization information, to the merchant device, to access an indication of an incentive status for the incentive. As discussed above, the authorization information may include an OAuth token, or another type of authorization information, that can enable the merchant device to access an indication of an incentive status associated with the user that is associated with the transaction account. In some implementations, the authorization information may provide access to the indication of the incentive status for a limited period.

In this way, the incentive management platform may provide information associated with the transaction account using increased security, which may result in conserving computing resources that may otherwise be used to identify, investigate, and recover from fraudulent activity and/or identity theft caused by misused or stolen authorization information.

The incentive management platform may provide the authorization information by routing the authorization information through the user device with or without additional input to the user device or by providing the authorization information to the merchant device without routing the authorization information through the user device. In some implementations, the incentive management platform may use information provided by the user device to identify the merchant device as a recipient of the authorization information. In some implementations, the authorization information may be configured to identify the merchant device as an authorized recipient of the authorization information.

As shown by reference number 114, the merchant device may associate the authorization information with a user account associated with the user device. In some implementations, the merchant device may store the authorization information, or information to access the authorization information, along with the user account.

As shown in FIG. 1C, and by reference number 116, the merchant device may receive a request for access to the service provided by the merchant device. The request may include credentials for the user account associated with the user device. In some implementations, the user device may request access to an incentive that may be available from the incentive management platform.

The merchant device may determine whether the incentive is available to provide to the user device, with the availability dependent on the incentive status associated with the user device. In some implementations, the merchant device may determine whether the incentive is available by comparing a list of known incentives with the incentive identified in the request from the user device to access the incentive, a payment account type of the user account associated with the user device, and/or the like. The merchant device may receive information for incentives on the list of known incentives from the incentive management platform, other devices associated with one or more transaction account providers, and/or the like.

As shown by reference number 118, the incentive management platform may receive an incentive status request from the merchant device. The incentive status request may include the authorization information, an identification of the merchant device, an identification of the user device, an identification of the transaction account, an identification of a requested incentive, and/or the like.

As shown by reference number 120, the incentive management platform may determine that the authorization information is valid and associated with the transaction account. In some implementations, the incentive management platform may compare the authorization information with a plurality of entries of authorization information to determine if the authorization information matches any of the entries, and if so, determine an identification of a transaction account associated with the matching authorization information entry. In some implementations, the incentive management platform may determine the identification of the transaction account by matching the transaction account with information included in, or associated with, the incentive status request, such as a transaction account identifier, an identification of the user device, a transaction card identifier that is associated with the transaction account, and/or the like.

As shown by reference number 122, the incentive management platform may identify one or more incentives, associated with the merchant, for a user of the transaction account. In some implementations, the incentive management platform may identify the one or more incentives from a set of candidate incentives, including incentives for one or more merchants, for which the incentive management platform may determine an incentive status. The incentive management platform may identify the one or more incentives based on the one or more incentives being associated with the merchant device, a characteristic (e.g., account type) of the transaction account, the one or more incentives being identified in the incentive status request, and/or the like.

Figure 1D:
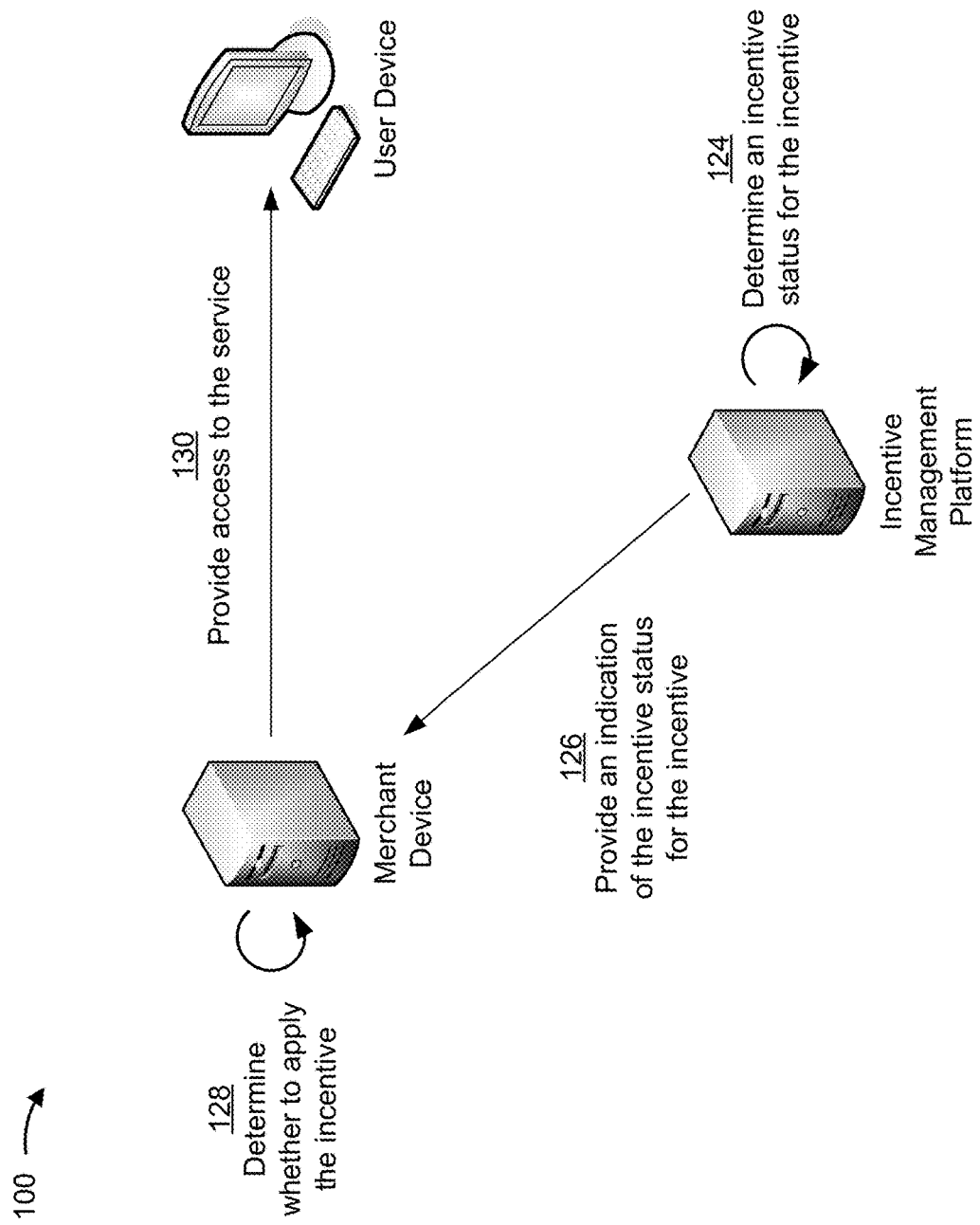

As shown in FIG. 1D, and by reference number 124, the incentive management platform may determine a current incentive status for the incentive. The incentive status may indicate that an incentive is available to the user associated with the transaction account or that the incentive is not available to the user.

The incentive status may be based on satisfaction of a condition associated with the transaction account. To determine whether the condition is satisfied, the incentive management platform may access a transaction history of the transaction account. In this way, the incentive management platform may determine, in real-time, a current incentive status for an incentive. For example, the incentive management platform may request the transaction history from another device based on permissions granted to the incentive management platform by the user device (e.g., in the set-up process associated with the transaction account). The incentive management platform may determine, from the transaction history, whether the condition associated with the transaction account is satisfied.

In some implementations, the condition may be associated with the transaction account being active, the user being current with payments for the transaction account, receiving timely payments associated with the transaction account, satisfaction of a threshold spending amount using the transaction account (e.g., during a defined period of time), the transaction account being used to purchase a qualifying product or service, maintaining a threshold amount of money in the transaction account, the transaction account performing recurring payments to another entity, and/or the like.

In some implementations, a transaction account score may be generated based on one or more conditions. For example, the transaction account score may be a weighted combination of multiple conditions, such as those described above. Weights applied to the conditions may be determined based on instructions from another device, a user, a transaction account scoring model, and/or the like. The incentive management platform may train (e.g., using a machine learning process such as the processes described above) the transaction account scoring model using information related to the multiple conditions and historical outcomes of whether users of transaction accounts maintain associated transaction accounts (e.g., determining a correlation between the multiple conditions and users maintaining the associated transaction accounts). In this way, the weighting may correspond to a relative amount that a condition of the multiple conditions correlates with users maintaining the associated transaction accounts. The incentive status may be based on whether the transaction account score satisfies a score threshold.

As shown by reference number 126, the incentive management platform may provide, to the merchant device, an indication of the incentive status for the incentive. The indication of the incentive status may enable the merchant device to determine whether to apply the incentive to the user account associated with the user. In some implementations, the incentive management platform may provide, to the merchant device, the definition of the incentive.

In some implementations, the incentive management platform may provide, to the user device, a notification indicating whether the incentive is accessible for the user. If the notification indicates that the incentive is unavailable to the user, the incentive management platform may provide the notification indicating that the incentive is unavailable to the user, an identification of one or more actions that would satisfy the condition associated with the transaction account to make the incentive available to the user, and/or the like.

As shown by reference number 128, the merchant device may determine whether to apply the incentive based on the indication of the incentive status received from the incentive management platform.

As shown by reference number 130, the merchant device may provide, to the user device, access to the service. In some implementations, the merchant device may determine an amount owed by the user and/or an amount owed by the transaction account provider associated with the incentive management platform. For example, if the incentive includes a 50% discount on a $20 per month streaming service, the merchant device may determine that the user owes the merchant $10 for one month of streaming service and that the remaining $10 for the month is owed by the transaction account provider. In some implementations, the amount owed by the transaction account provider is discounted (e.g., the entity may owe only $8 instead of $10 in the example described above). The merchant device may provide, to the incentive management platform, an indication of an amount owed to the merchant based on the merchant device providing the incentive to the user. The incentive management platform may provide a payment of the amount owed to a transaction account associated with the merchant.

In some implementations where the incentive management platform indicates that the incentive is available to the user, the incentive management platform may determine that a condition is no longer satisfied and the incentive is no longer available. For example, the incentive management platform may determine that the transaction account has been closed, is no longer current with payments, the threshold spending amount is no longer satisfied, the transaction account has not been used to purchase a qualifying product or service within a specified time period, the transaction account is no longer performing recurring payments to another entity, and/or the like.

Based on determining that the condition is no longer satisfied, the incentive management platform may provide, to the merchant device, an indication that the incentive is no longer available to the user. In some implementations, the user associated with the transaction account may qualify for the incentives based on satisfying a condition (e.g., satisfying a spending threshold) and then cancel the transaction account after qualifying for the incentive. To discourage this behavior, and to conserve the computing resources associated with the canceling and secure storage of account data, the incentive management platform may provide the indication that the incentive is no longer available. In some implementations, the incentive management platform may provide the notification without requiring another request for an incentive status (e.g., upon discovering that the condition is no longer met).

In some implementations, the incentive management platform may receive another incentive status request from the merchant (e.g., based on another request by the user device for access to the service, elapsing of a predetermined time, and/or the like), determine that the incentive is no longer available based on the condition no longer being satisfied, and provide an indication that the incentive is no longer available to the user. The incentive management platform may also provide the indication within a notification to the user device to inform the user device that the incentive is no longer available, and/or one or more actions that may satisfy the condition associated with the user account to qualify for the incentive.

The techniques described above may conserve computing resources that may otherwise be used during a conventional verification process for determining whether a user of a merchant service is allowed access to an incentive. Additionally, by dynamically managing incentives provided by merchants, the incentive management platform and other devices may conserve computing resources that may otherwise be used cancel transaction accounts, maintain secure records associated with the transaction accounts, generate new transaction accounts, associate one or more payment methods to the new transaction accounts, perform security checks on the new transaction accounts, associate the new transaction accounts with one or more incentives, and/or the like.

Further, the transaction account may be more secure than if the user device provides credentials for the transaction account to merchant devices. This may conserve computing resources that may otherwise be used to identify, investigate, and recover from fraudulent activity and/or identity theft caused by misused or stolen credentials to the transaction account.

As indicated above, FIGS. 1A-1D are provided as one or more examples. Other examples may differ from what is described with regard to FIGS. 1A-1D.

Figure 2:
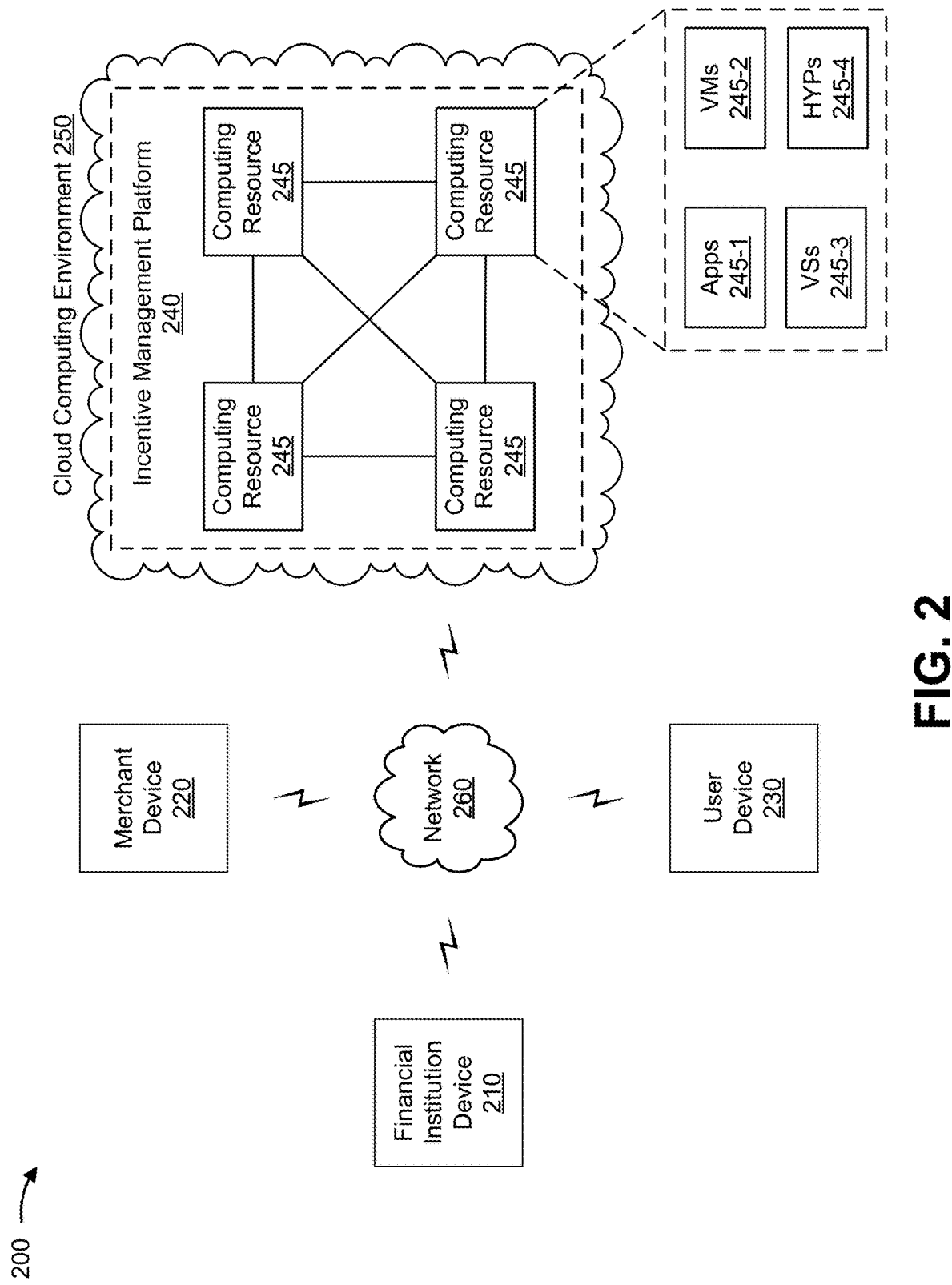
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a financial institution device 210, a merchant device 220, a user device 230, an incentive management platform 240, a computing resource 245, a cloud computing environment 250, and a network 260. Devices of environment 200 may interconnect via wired connections, wireless connections, or a combination of wired and wireless connections.

Financial institution device 210 includes one or more devices capable of receiving, generating, storing, processing, and/or providing information associated with determining and/or providing information related to a transaction account (e.g., a transaction history). For example, financial institution device 210 may include a server device (e.g., a host server, a web server, an application server, etc.), a data center device, a cloud computing device in a cloud computing environment, or a similar device. In some implementations, financial institution device 210 may receive, from the incentive management platform 240, a request for information related to a transaction account associated with a user of the merchant device 220.

Merchant device 220 includes one or more devices capable of receiving, generating, storing, processing, and/or providing information associated with determining and/or providing information related to a merchant (e.g., media content, permissions for access, user account information, billing for services, and/or the like). For example, merchant device 220 may include a server device (e.g., a host server, a web server, an application server, etc.), a data center device, a cloud computing device in a cloud computing environment, or a similar device. In some implementations, merchant device 220 may receive, from the incentive management platform 240, an identification of an incentive, authorization information, an indication of an incentive status for an incentive, and/or the like. In some implementations, merchant device 220 may provide, to incentive management platform 240, an incentive status request, an identification of the transaction account associated with the incentive status request, the authentication information, and/or the like. Merchant device 220 may also communicate with user device 230 to perform a user account set-up operation, provide an interface for user device 230 to provide credentials to incentive management platform 240, receive a request for access to a service, provide access to the service, and/or the like.

User device 230 includes one or more devices capable of receiving, generating, storing, processing, and/or providing information associated with providing credentials and/or authorization to incentive management platform 240 to provide authorization information to merchant device 220. For example, user device 230 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Incentive management platform 240 includes one or more computing resources assigned to determine an incentive status for an incentive associated with user device 230. For example, incentive management platform 240 may be a platform implemented by cloud computing environment 250 that may provide an incentive status to merchant device 220 so that merchant device 220 may determine whether to apply an incentive to a user account associated with the user of user device 230. In some implementations, incentive management platform 240 is implemented by computing resources 245 of cloud computing environment 250.

Incentive management platform 240 may include a server device or a group of server devices. In some implementations, incentive management platform 240 may be hosted in cloud computing environment 250. Notably, while implementations described herein may describe incentive management platform 240 as being hosted in cloud computing environment 250, in some implementations, incentive management platform 240 may be non-cloud-based or may be partially cloud-based.

Cloud computing environment 250 includes an environment that delivers computing as a service, whereby shared resources, services, and/or the like may be provided to determine one or more incentives to increase a probability of the user maintaining a status of an associated transaction account, perform a set-up process for the transaction account associated with user device 230, receive credentials and/or a request to provide authorization information from user device 230, provide authorization information to merchant device 220, receive an incentive status request from merchant device 220, determine that the authorization information within the request is valid, identify an incentive associated with the merchant, determine an incentive status for an incentive for the user associated with the transaction account, provide an indication of the incentive status to merchant device 220, and/or the like.

Cloud computing environment 250 may provide computation, software, data access, storage, and/or other services that do not require end-user knowledge of a physical location and configuration of a system and/or a device that delivers the services. As shown, cloud computing environment 250 may include incentive management platform 240 and computing resource 245.

Computing resource 245 includes one or more personal computers, workstation computers, server devices, or another type of computation and/or communication device. In some implementations, computing resource 245 may host incentive management platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by user device 230. Application 245-1 may eliminate a need to install and execute the software applications on user device 230. For example, application 245-1 may include software associated with incentive management platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., user device 230), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the "guest operating systems" and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
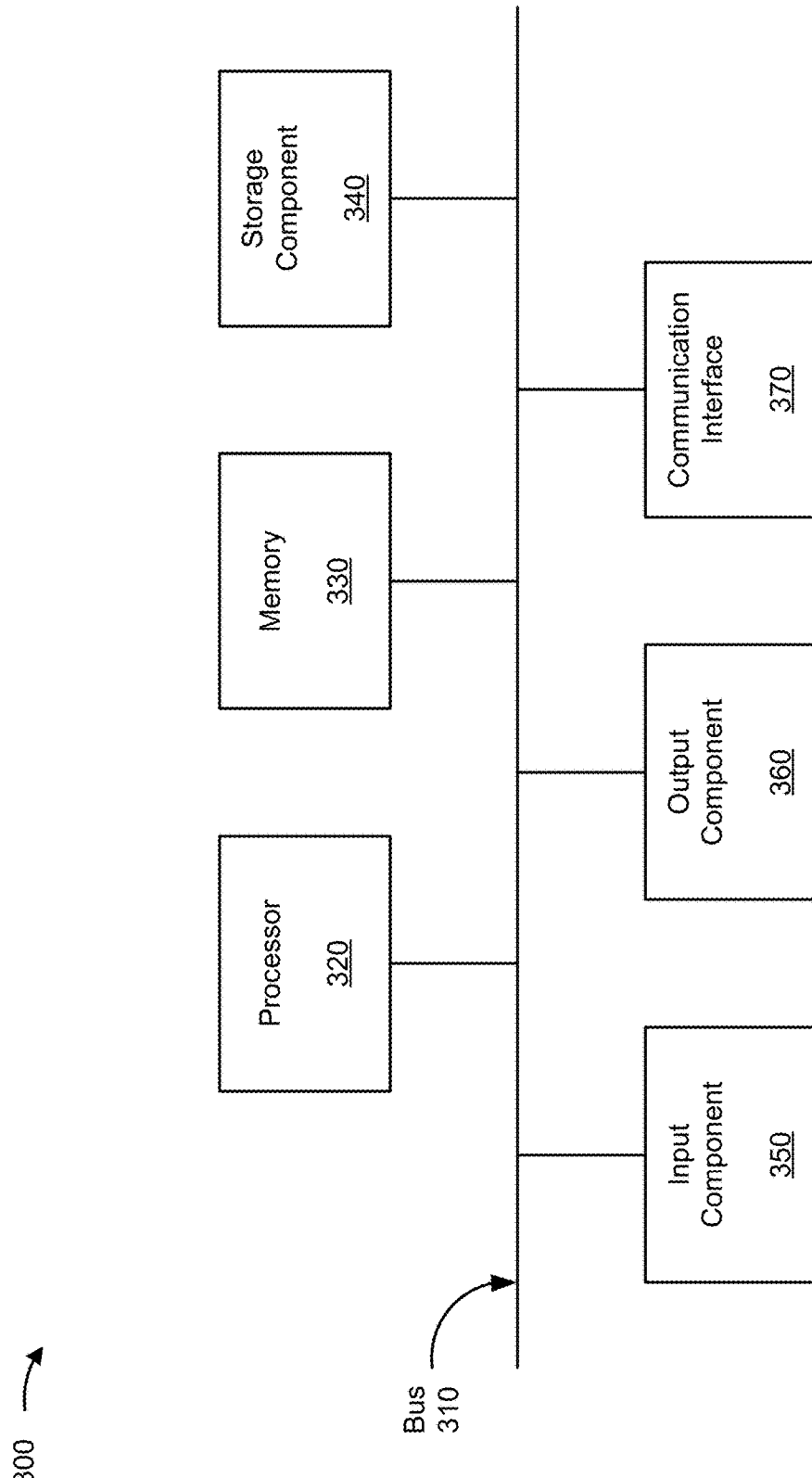
FIG. 3 is a diagram of example components of one or more devices of FIG. 2.

FIG. 3 is a diagram of example components of a device 300. Device 300 may correspond to financial institution device 210, merchant device 220, user device 230, incentive management platform 240, and/or computing resource 245. In some implementations, financial institution device 210, merchant device 220, user device 230, incentive management platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
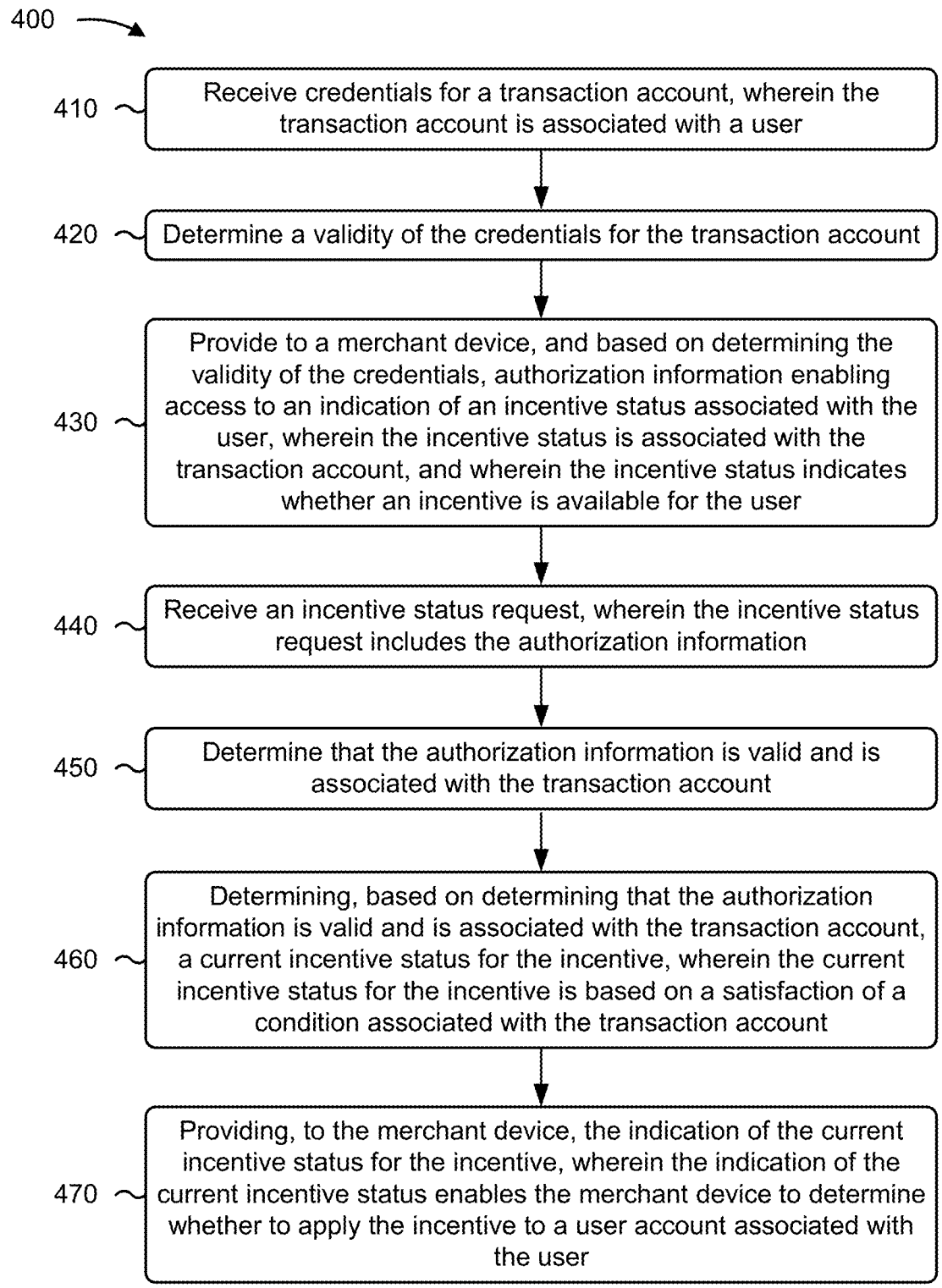
FIGS. 4-6 are flowcharts of example processes for providing, to a merchant device associated with an incentive, an indication of a current incentive status for the incentive.

FIG. 4 is a flow chart of an example process 400 for providing, to a merchant device associated with an incentive, an indication of a current incentive status for the incentive. In some implementations, one or more process blocks of FIG. 4 may be performed by a device (e.g., incentive management platform 240). In some implementations, one or more process blocks of FIG. 4 may be performed by another device or a group of devices separate from or including the device, such as a financial institution device (e.g., financial institution device 210), a merchant device (e.g., merchant device 220), a user device (e.g., user device 230), and/or the like.

As shown in FIG. 4, process 400 may include receiving, from a user device, credentials for a transaction account, wherein the transaction account is associated with a user (block 410). For example, the device (e.g., using computing resource 245, processor 320, memory 330, storage component 340, input component 350, output component 360, communication interface 370 and/or the like) may receive, from a user device, credentials for a transaction account, as described above. In some implementations, the transaction account is associated with a user.

As further shown in FIG. 4, process 400 may include determining a validity of the credentials for the transaction account (block 420). For example, the device (e.g., using computing resource 245, processor 320, memory 330, storage component 340, input component 350, output component 360, communication interface 370 and/or the like) may determine a validity of the credentials for the transaction account, as described above.

As further shown in FIG. 4, process 400 may include providing to a merchant device, and based on determining the validity of the credentials, authorization information enabling access to an indication of an incentive status associated with the user, wherein the incentive status is associated with the transaction account, and wherein the incentive status indicates whether an incentive is available for the user (block 430). For example, the device (e.g., using computing resource 245, processor 320, memory 330, storage component 340, input component 350, output component 360, communication interface 370 and/or the like) may provide to a merchant device, and based on determining the validity of the credentials, authorization information enabling access to an indication of an incentive status associated with the user, as described above. In some implementations, the incentive status is associated with the transaction account. In some implementations, the incentive status indicates whether an incentive is available for the user.

As further shown in FIG. 4, process 400 may include receiving, from the merchant device, an incentive status request, wherein the incentive status request includes the authorization information (block 440). For example, the device (e.g., using computing resource 245, processor 320, memory 330, storage component 340, input component 350, output component 360, communication interface 370 and/or the like) may receive, from the merchant device, an incentive status request, as described above. In some implementations, the incentive status request includes the authorization information.

As further shown in FIG. 4, process 400 may include determining that the authorization information is valid and is associated with the transaction account (block 450). For example, the device (e.g., using computing resource 245, processor 320, memory 330, storage component 340, input component 350, output component 360, communication interface 370 and/or the like) may determine that the authorization information is valid and is associated with the transaction account, as described above.

As further shown in FIG. 4, process 400 may include determining, based on determining that the authorization information is valid and is associated with the transaction account, a current incentive status for the incentive, wherein the current incentive status for the incentive is based on a satisfaction of a condition associated with the transaction account (block 460). For example, the device (e.g., using computing resource 245, processor 320, memory 330, storage component 340, input component 350, output component 360, communication interface 370 and/or the like) may determine, based on determining that the authorization information is valid and is associated with the transaction account, a current incentive status for the incentive, as described above. In some implementations, the current incentive status for the incentive is based on a satisfaction of a condition associated with the transaction account.

As further shown in FIG. 4, process 400 may include providing, to the merchant device, the indication of the current incentive status for the incentive, wherein the indication of the current incentive status enables the merchant device to determine whether to apply the incentive to a user account associated with the user (block 470). For example, the device (e.g., using computing resource 245, processor 320, memory 330, storage component 340, input component 350, output component 360, communication interface 370 and/or the like) may provide, to the merchant device, the indication of the current incentive status for the incentive, as described above. In some implementations, the indication of the current incentive status enables the merchant device to determine whether to apply the incentive to a user account associated with the user.

Process 400 may include additional implementations, such as any single implementation or any combination of implementations described below and/or in connection with one or more other processes described elsewhere herein.

In a first implementation, process 400 further comprises: accessing a transaction history of the transaction account; and determining, from the transaction history, whether the condition associated with the transaction account is satisfied.

In a second implementation, alone or in combination with the first implementation, process 400 further comprises: identifying the incentive, from a set of candidate incentives, based on the incentive being associated with the merchant device.

In a third implementation, alone or in combination with one or more of the first and second implementations, process 400 further comprises: determining the incentive, using a machine learning process, based on the incentive resulting in an increase of a probability of the user maintaining a status of the transaction account, the increase of the probability satisfies a threshold increase of the probability.

In a fourth implementation, alone or in combination with one or more of the first through third implementations, the condition associated with the transaction account is associated with one or more of: the transaction account being active, the user being current with payments for the transaction account, satisfaction of a threshold spending amount using the transaction account, the transaction account being used to purchase a qualifying product or service, or the transaction account performing recurring payments to another entity.

In a fifth implementation, alone or in combination with one or more of the first through fourth implementations, the authorization information includes an open authorization (OAuth) token, and the OAuth token provides access to the indication of the incentive status for a limited period.

In a sixth implementation, alone or in combination with one or more of the first through fifth implementations, the indication is a first indication, the first indication of the incentive status indicates that the incentive is available to the user; and process 400 further comprises: determining that the incentive is no longer available based on the condition associated with the transaction account no longer being satisfied; and providing, to the merchant device, a second indication that indicates that the incentive is no longer available to the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
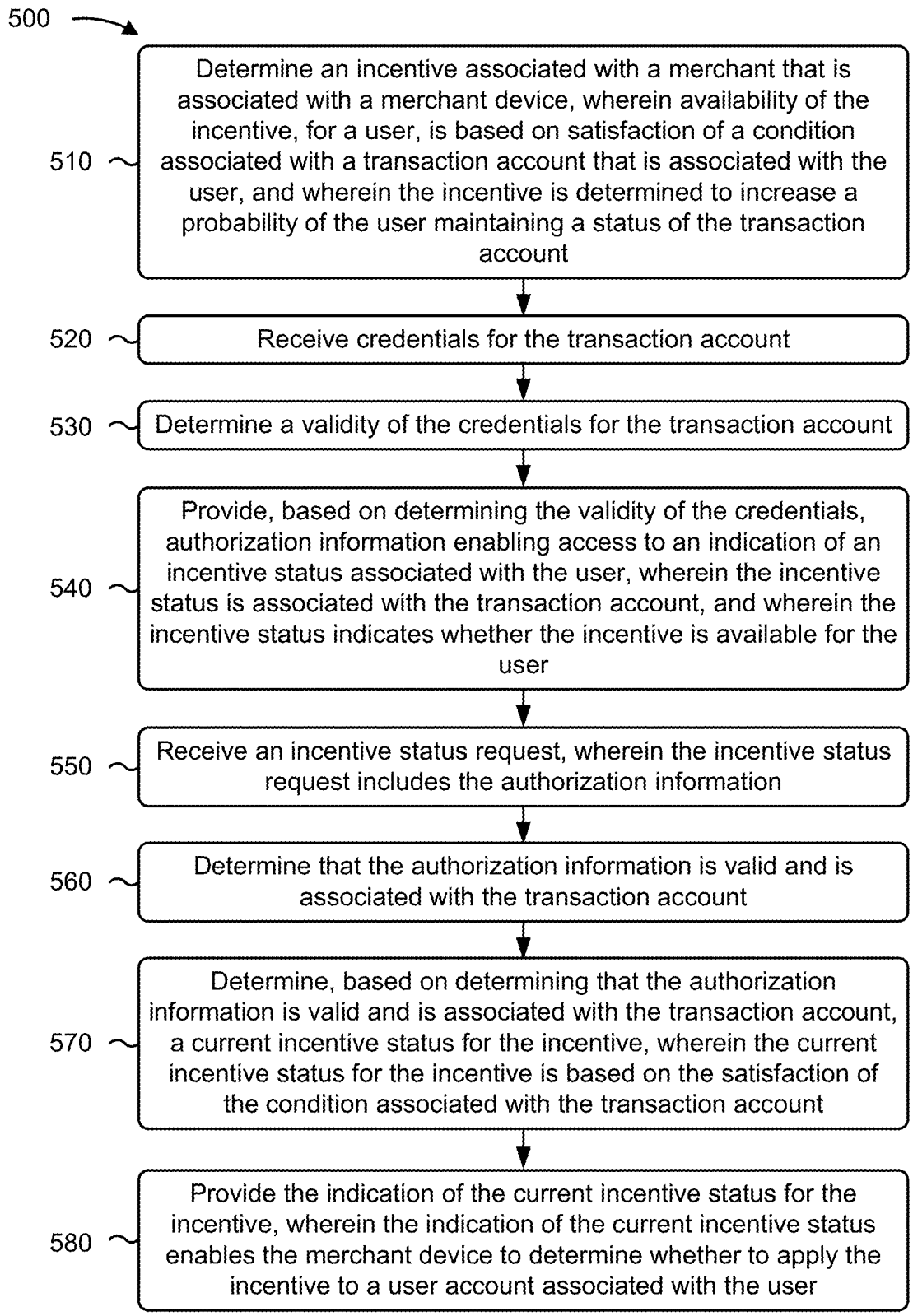

FIG. 5 is a flow chart of an example process 500 for providing, to a merchant device associated with an incentive, an indication of a current incentive status for the incentive. In some implementations, one or more process blocks of FIG. 5 may be performed by a device (e.g., incentive management platform 240). In some implementations, one or more process blocks of FIG. 5 may be performed by another device or a group of devices separate from or including the device, such as a financial institution device (e.g., financial institution device 210), a merchant device (e.g., merchant device 220), a user device (e.g., user device 230), and/or the like.

As shown in FIG. 5, process 500 may include determining an incentive associated with a merchant that is associated with a merchant device, wherein availability of the incentive, for a user, is based on satisfaction of a condition associated with a transaction account that is associated with the user, and wherein the incentive is determined to increase a probability of the user maintaining a status of the transaction account (block 510). For example, the device (e.g., using computing resource 245, processor 320, memory 330, storage component 340, input component 350, output component 360, communication interface 370 and/or the like) may determine an incentive associated with a merchant that is associated with a merchant device, as described above. In some implementations, availability of the incentive, for a user, is based on satisfaction of a condition associated with a transaction account that is associated with the user. In some implementations, the incentive is determined to increase a probability of the user maintaining a status of the transaction account.

As further shown in FIG. 5, process 500 may include receiving, from a user device, credentials for the transaction account (block 520). For example, the device (e.g., using computing resource 245, processor 320, memory 330, storage component 340, input component 350, output component 360, communication interface 370 and/or the like) may receive, from a user device, credentials for the transaction account, as described above.

As further shown in FIG. 5, process 500 may include determining a validity of the credentials for the transaction account (block 530). For example, the device (e.g., using computing resource 245, processor 320, memory 330, storage component 340, input component 350, output component 360, communication interface 370 and/or the like) may determine a validity of the credentials for the transaction account, as described above.

As further shown in FIG. 5, process 500 may include providing, to the merchant device and based on determining the validity of the credentials, authorization information enabling access to an indication of an incentive status associated with the user, wherein the incentive status is associated with the transaction account, and wherein the incentive status indicates whether the incentive is available for the user (block 540). For example, the device (e.g., using computing resource 245, processor 320, memory 330, storage component 340, input component 350, output component 360, communication interface 370 and/or the like) may provide, to the merchant device and based on determining the validity of the credentials, authorization information enabling access to an indication of an incentive status associated with the user, as described above. In some implementations, the incentive status is associated with the transaction account. In some implementations, the incentive status indicates whether the incentive is available for the user.

As further shown in FIG. 5, process 500 may include receiving, from the merchant device, an incentive status request, wherein the incentive status request includes the authorization information (block 550). For example, the device (e.g., using computing resource 245, processor 320, memory 330, storage component 340, input component 350, output component 360, communication interface 370 and/or the like) may receive, from the merchant device, an incentive status request, as described above. In some implementations, the incentive status request includes the authorization information.

As further shown in FIG. 5, process 500 may include determining that the authorization information is valid and is associated with the transaction account (block 560). For example, the device (e.g., using computing resource 245, processor 320, memory 330, storage component 340, input component 350, output component 360, communication interface 370 and/or the like) may determine that the authorization information is valid and is associated with the transaction account, as described above.

As further shown in FIG. 5, process 500 may include determining, based on determining that the authorization information is valid and is associated with the transaction account, a current incentive status for the incentive, wherein the current incentive status for the incentive is based on the satisfaction of the condition associated with the transaction account (block 570). For example, the device (e.g., using computing resource 245, processor 320, memory 330, storage component 340, input component 350, output component 360, communication interface 370 and/or the like) may determine, based on determining that the authorization information is valid and is associated with the transaction account, a current incentive status for the incentive, as described above. In some implementations, the current incentive status for the incentive is based on the satisfaction of the condition associated with the transaction account.

As further shown in FIG. 5, process 500 may include providing, to the merchant device, the indication of the current incentive status for the incentive, wherein the indication of the current incentive status enables the merchant device to determine whether to apply the incentive to a user account associated with the user (block 580). For example, the device (e.g., using computing resource 245, processor 320, memory 330, storage component 340, input component 350, output component 360, communication interface 370 and/or the like) may provide, to the merchant device, the indication of the current incentive status for the incentive, as described above. In some implementations, the indication of the current incentive status enables the merchant device to determine whether to apply the incentive to a user account associated with the user.

Process 500 may include additional implementations, such as any single implementation or any combination of implementations described below and/or in connection with one or more other processes described elsewhere herein.

In a first implementation, the indication of the incentive status indicates that the incentive is unavailable to the user, and process 500 further includes: providing, to the user device, a notification indicating that the incentive is unavailable to the user.

In a second implementation, alone or in combination with the first implementation, the notification comprises an identification of one or more actions that would satisfy the condition associated with the transaction account.

In a third implementation, alone or in combination with one or more of the first and second implementations, process 500 further includes: accessing a transaction history of the transaction account; and determining, from the transaction history, whether the condition associated with the transaction account is satisfied.

In a fourth implementation, alone or in combination with one or more of the first through third implementations, process 500 further includes: providing, to the merchant device, a definition of the incentive, and the definition of the incentive comprises one or more of: a duration of activity of the incentive, a quantity of uses of the incentive available to the user, a discount amount for a product or service associated with the merchant, or a type of product or service, associated with the merchant, to which the incentive provides access.

In a fifth implementation, alone or in combination with one or more of the first through fourth implementations, the condition associated with the transaction account is associated with one or more of: the transaction account being active, the user being current with payments for the transaction account, satisfaction of a threshold spending amount using the transaction account, the transaction account being used to purchase a qualifying product or service, or the transaction account performing recurring payments to another entity.

In a sixth implementation, alone or in combination with one or more of the first through fifth implementations, the incentive status request is a first incentive status request and the indication is a first indication, the first indication of the incentive status indicates that the incentive is available to the user, and process 500 further includes: receiving, from the merchant device, a second incentive status request; determining that the incentive is no longer available based on the condition associated with the transaction account no longer being satisfied; and providing, to the merchant device, a second indication that indicates that the incentive is no longer available to the user.

In a seventh implementation, alone or in combination with one or more of the first through sixth implementations, the incentive relates to a streaming service provided, to the user device, by the merchant.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
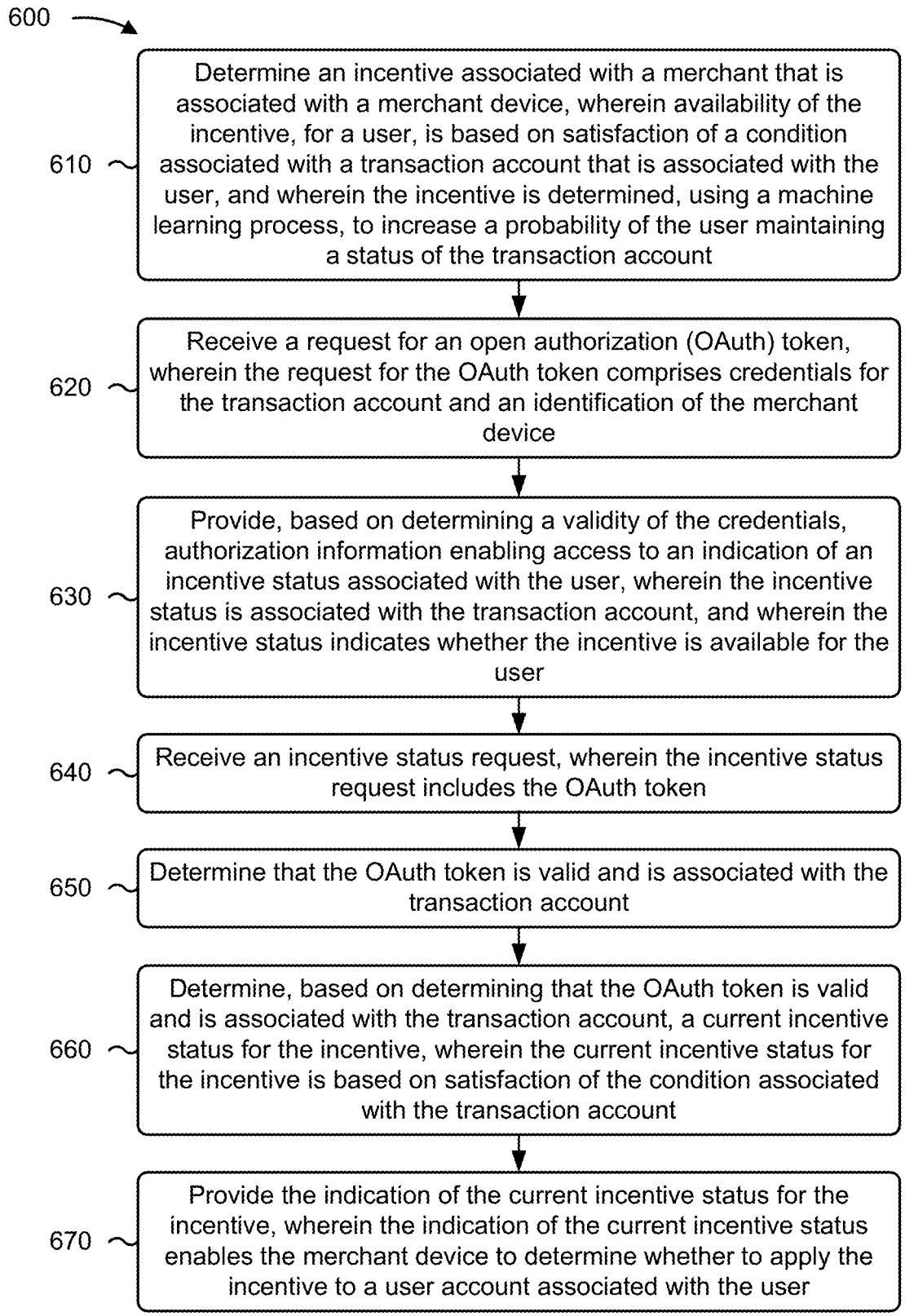

FIG. 6 is a flow chart of an example process 600 for providing, to a merchant device associated with an incentive, an indication of a current incentive status for the incentive. In some implementations, one or more process blocks of FIG. 6 may be performed by a device (e.g., incentive management platform 240). In some implementations, one or more process blocks of FIG. 6 may be performed by another device or a group of devices separate from or including the device, such as a financial institution device (e.g., financial institution device 210), a merchant device (e.g., merchant device 220), a user device (e.g., user device 230), and/or the like.

As shown in FIG. 6, process 600 may include determining an incentive associated with a merchant that is associated with a merchant device, wherein availability of the incentive, for a user, is based on satisfaction of a condition associated with a transaction account that is associated with the user, and wherein the incentive is determined, using a machine learning process, to increase a probability of the user maintaining a status of the transaction account (block 610). For example, the device (e.g., using computing resource 245, processor 320, memory 330, storage component 340, input component 350, output component 360, communication interface 370 and/or the like) may determine an incentive associated with a merchant that is associated with a merchant device, as described above. In some implementations, availability of the incentive, for a user, is based on satisfaction of a condition associated with a transaction account that is associated with the user. In some implementations, the incentive is determined, using a machine learning process, to increase a probability of the user maintaining a status of the transaction account.

As further shown in FIG. 6, process 600 may include receiving, from a user device, a request for an open authorization (OAuth) token, wherein the request for the OAuth token comprises credentials for the transaction account and an identification of the merchant device (block 620). For example, the device (e.g., using computing resource 245, processor 320, memory 330, storage component 340, input component 350, output component 360, communication interface 370 and/or the like) may receive, from a user device, a request for an open authorization (OAuth) token, as described above. In some implementations, the request for the OAuth token comprises credentials for the transaction account and an identification of the merchant device.

As further shown in FIG. 6, process 600 may include providing, to the merchant device and based on determining a validity of the credentials, authorization information enabling access to an indication of an incentive status associated with the user, wherein the incentive status is associated with the transaction account, and wherein the incentive status indicates whether the incentive is available for the user (block 630). For example, the device (e.g., using computing resource 245, processor 320, memory 330, storage component 340, input component 350, output component 360, communication interface 370 and/or the like) may provide, to the merchant device and based on determining a validity of the credentials, authorization information enabling access to an indication of an incentive status associated with the user, as described above. In some implementations, the incentive status is associated with the transaction account. In some implementations, the incentive status indicates whether the incentive is available for the user.

As further shown in FIG. 6, process 600 may include receiving, from the merchant device, an incentive status request, wherein the incentive status request includes the OAuth token (block 640). For example, the device (e.g., using computing resource 245, processor 320, memory 330, storage component 340, input component 350, output component 360, communication interface 370 and/or the like) may receive, from the merchant device, an incentive status request, as described above. In some implementations, the incentive status request includes the OAuth token.

As further shown in FIG. 6, process 600 may include determining that the OAuth token is valid and is associated with the transaction account (block 650). For example, the device (e.g., using computing resource 245, processor 320, memory 330, storage component 340, input component 350, output component 360, communication interface 370 and/or the like) may determine that the OAuth token is valid and is associated with the transaction account, as described above.

As further shown in FIG. 6, process 600 may include determining, based on determining that the OAuth token is valid and is associated with the transaction account, a current incentive status for the incentive, wherein the current incentive status for the incentive is based on satisfaction of the condition associated with the transaction account (block 660). For example, the device (e.g., using computing resource 245, processor 320, memory 330, storage component 340, input component 350, output component 360, communication interface 370 and/or the like) may determine, based on determining that the OAuth token is valid and is associated with the transaction account, a current incentive status for the incentive, as described above. In some implementations, the current incentive status for the incentive is based on satisfaction of the condition associated with the transaction account.

As further shown in FIG. 6, process 600 may include providing, to the merchant device, the indication of the current incentive status for the incentive, wherein the indication of the current incentive status enables the merchant device to determine whether to apply the incentive to a user account associated with the user (block 670). For example, the device (e.g., using computing resource 245, processor 320, memory 330, storage component 340, input component 350, output component 360, communication interface 370 and/or the like) may provide, to the merchant device, the indication of the current incentive status for the incentive, as described above. In some implementations, the indication of the current incentive status enables the merchant device to determine whether to apply the incentive to a user account associated with the user.

Process 600 may include additional implementations, such as any single implementation or any combination of implementations described below and/or in connection with one or more other processes described elsewhere herein.

In a first implementation, the indication of the incentive status indicates that the incentive is available, and process 600 further includes: receiving, from the merchant device, an indication of an amount owed to the merchant based on the merchant device providing the incentive to the user; and providing a payment of the amount owed to a transaction account associated with the merchant.

In a second implementation, alone or in combination with the first implementation, the one or more instructions, when executed by the one or more processors, further cause the one or more processors to: access a transaction history of the transaction account; and determine, from the transaction history, whether the condition associated with the transaction account is satisfied.

In a third implementation, alone or in combination with one or more of the first and second implementations, process 600 further includes providing, to the merchant device, a definition of the incentive, and the definition of the incentive comprises one or more of: a duration of activity of the incentive, a quantity of uses of the incentive available to the user, a discount amount for a product or a service associated with the merchant, or access to the product or the service associated with the merchant.

In a fourth implementation, alone or in combination with one or more of the first through third implementations, the indication of the incentive status indicates that the incentive is unavailable to the user, and process 600 further includes: providing, to the user device, an indication that the incentive is unavailable to the user; and providing, to the user device, an indication of an action that would satisfy the condition associated with the transaction account.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a user device, credentials for a transaction account,
   wherein the transaction account is associated with a user;
determining, by the device, a validity of the credentials for the transaction account;
providing, by the device, to a merchant device, and based on determining the validity of the credentials, an open authorization (OAuth) token that enables the merchant device to access limited information about the transaction account including an indication of an incentive status associated with the user,
   wherein the incentive status is based on one or more conditions, associated with the transaction account, that affects whether an incentive, associated with the merchant device, is available for the user,
   wherein the incentive is provided by a third-party merchant, and
   wherein the merchant device is associated with the third-party merchant;
receiving, by the device and from the merchant device, an incentive status request,
   wherein the incentive status request includes the OAuth token;
determining, by the device, that the OAuth token is valid and is associated with the transaction account;
generating, by the device and based on determining that the OAuth token is valid and is associated with the transaction account, a transaction account score based on a weighted combination of the one or more conditions;
determining, by the device and based on determining that the transaction account score satisfies a threshold, a current incentive status for the incentive;
training, by the device, an incentives model based on the incentive causing an increase of a probability of the user maintaining a status of the transaction account,
   wherein the increase of the probability satisfies a threshold increase of the probability; and
providing, by the device and to the merchant device, another indication of the current incentive status for the incentive output by the incentives model,
   wherein the other indication of the current incentive status enables the merchant device to determine whether to apply the incentive to a user account associated with the user.

2. The method of claim 1, further comprising:
accessing a transaction history of the transaction account; and determining, from the transaction history, whether the one or more conditions associated with the transaction account are satisfied.

3. The method of claim 1, further comprising:
identifying the incentive, from a set of candidate incentives, based on the incentive being associated with the merchant device.

4. The method of claim 1, wherein the one or more conditions associated with the transaction account are associated with one or more of:
the transaction account being active,
the user being current with payments for the transaction account,
satisfaction of a threshold spending amount using the transaction account,
the transaction account being used to purchase a qualifying product or service, or
the transaction account performing recurring payments to another entity.

5. The method of claim 1,
wherein the OAuth token provides access to the indication of the incentive status for a limited period.

6. The method of claim 1, wherein the indication is a first indication,
wherein the first indication of the incentive status indicates that the incentive is available to the user; and
wherein the method further comprises:
determining that the incentive is no longer available based on the one or more conditions associated with the transaction account no longer being satisfied; and
providing, to the merchant device, a second indication that indicates that the incentive is no longer available to the user.

7. A device, comprising:
one or more memories; and
one or more processors, communicatively coupled to the one or more memories, configured to:
determine an incentive associated with a merchant that is associated with a merchant device,
wherein availability of the incentive, for a user, is based on satisfaction of one or more conditions associated with a transaction account that is associated with the user, and
wherein the incentive is determined to increase a probability of the user maintaining a status of the transaction account;
receive, from a user device, credentials for the transaction account;
determine a validity of the credentials for the transaction account;
provide, to the merchant device and based on determining the validity of the credentials, an open authorization (OAuth) token that enables the merchant device to access limited information about the transaction account including an indication of an incentive status associated with the user,
wherein the incentive status is associated with the transaction account, and
wherein the incentive status indicates whether the incentive is available for the user,
wherein the incentive is provided by a third-party merchant, and
wherein the merchant device is associated with the third-party merchant;
receive, from the merchant device, an incentive status request,
wherein the incentive status request includes the OAuth token;
determine that the OAuth token is valid and is associated with the transaction account;
generate, based on determining that the OAuth token is valid and is associated with the transaction account, a transaction account score based on a weighted combination of the one or more conditions;
determine, based on determining that the transaction account score satisfies a threshold, a current incentive status for the incentive;
train an incentives model based on the incentive causing an increase of a probability of the user maintaining a status of the transaction account,
wherein the increase of the probability satisfies a threshold increase of the probability; and
provide, to the merchant device, another indication of the current incentive status for the incentive output by the incentives model,
wherein the other indication of the current incentive status enables the merchant device to determine whether to apply the incentive to a user account associated with the user.

8. The device of claim 7, wherein the indication of the incentive status indicates that the incentive is unavailable to the user; and
wherein the one or more processors are further configured to provide, to the user device, a notification indicating that the incentive is unavailable to the user.

9. The device of claim 8, wherein the notification comprises an identification of one or more actions that would satisfy the one or more conditions associated with the transaction account.

10. The device of claim 7, wherein the one or more processors are further configured to:
access a transaction history of the transaction account; and
determine, from the transaction history, whether the one or more conditions associated with the transaction account are satisfied.

11. The device of claim 7, wherein the one or more processors are further configured to
provide, to the merchant device, a definition of the incentive, and
wherein the definition of the incentive comprises information identifying one or more of:
a duration of activity of the incentive,
a quantity of uses of the incentive available to the user,
a discount amount for a product or service associated with the merchant, or
a product or service, associated with the merchant, to which the incentive provides access.

12. The device of claim 7, wherein the one or more conditions associated with the transaction account are associated with one or more of:
the transaction account being active,
the user being current with payments for the transaction account,
satisfaction of a threshold spending amount using the transaction account,
the transaction account being used to purchase a qualifying product or service, or
the transaction account performing recurring payments to another entity.

13. The device of claim 7, wherein the incentive status request is a first incentive status request and the indication is a first indication, wherein the first indication of the incentive status indicates that the incentive is available to the user, and wherein the one or more processors are further configured to:

receive, from the merchant device, a second incentive status request;

determine that the incentive is no longer available based on the one or more conditions associated with the transaction account no longer being satisfied; and provide, to the merchant device, a second indication that indicates that the incentive is no longer available to the user.

14. The device of claim 7, wherein the incentive relates to a streaming service provided, to the user device, by the merchant.

15. A non-transitory computer-readable medium storing instructions, the instructions comprising:

one or more instructions that, when executed by one or more processors, cause the one or more processors to:

determine an incentive associated with a merchant that is associated with a merchant device, wherein availability of the incentive, for a user, is based on satisfaction of one or more conditions associated with a transaction account that is associated with the user, and wherein the incentive is determined, using a machine learning process, to increase a probability of the user maintaining a status of the transaction account; receive, from a user device, a request for an open authorization (OAuth) token, wherein the request for the OAuth token comprises credentials for the transaction account and an identification of the merchant device that enables the merchant device to access limited information about the transaction account;

provide, to the merchant device and based on determining a validity of the credentials, authorization information enabling access to information about the transaction account including an indication of an incentive status associated with the user, wherein the incentive status is associated with the transaction account, and wherein the incentive status indicates whether the incentive is available for the user, wherein the incentive is provided by a third-party merchant, and wherein the merchant device is associated with the third-party merchant;

receive, from the merchant device, an incentive status request, wherein the incentive status request includes the OAuth token;

determine that the OAuth token is valid and is associated with the transaction account;

generate, based on determining that that the OAuth token is valid and is associated with the transaction account, a transaction account score based on a weighted combination of the one or more conditions;

determine, based on determining that the transaction account score satisfies a threshold, a current incentive status for the incentive;

train an incentives model based on the incentive causing an increase of a probability of the user maintaining a status of the transaction account, wherein the increase of the probability satisfies a threshold increase of the probability; and provide, to the merchant device, another indication of the current incentive status for the incentive output by the incentives model, wherein the other indication of the current incentive status enables the merchant device to determine whether to apply the incentive to a user account associated with the user.

16. The non-transitory computer-readable medium of claim 15, wherein the indication of the incentive status indicates that the incentive is available, and wherein the one or more instructions, when executed by the one or more processors, further cause the one or more processors to:

receive, from the merchant device, an indication of an amount owed to the merchant based on the merchant device providing the incentive to the user; and provide a payment of the amount owed to a transaction account associated with the merchant.

17. The non-transitory computer-readable medium of claim 15, wherein the one or more instructions, when executed by the one or more processors, further cause the one or more processors to:

access a transaction history of the transaction account; and determine, from the transaction history, whether the one or more conditions associated with the transaction account are satisfied.

18. The non-transitory computer-readable medium of claim 15, wherein the one or more instructions, when executed by the one or more processors, further cause the one or more processors to provide, to the merchant device, a definition of the incentive, wherein the definition of the incentive comprises information one or more of:

a duration of activity of the incentive, a quantity of uses of the incentive available to the user, a discount amount for a product or a service associated with the merchant, or access to the product or the service associated with the merchant.

19. The non-transitory computer-readable medium of claim 15, wherein the indication of the incentive status indicates that the incentive is unavailable to the user, and wherein the one or more instructions cause the one or more processors to:

provide, to the user device, an indication that the incentive is unavailable to the user; and provide, to the user device, an indication of an action that would satisfy the one or more conditions associated with the transaction account.

20. The method of claim 1, further comprising:

generating the incentives model based on historical incentives and information regarding whether the historical incentives caused an increased historical probability of historical users maintaining a status of historical transaction accounts.

* * * * *